May 28, 1957
D. M. FINCH
2,793,505
PADDLE-OUT ICE CREAM FREEZER
Filed Sept. 23, 1955
2 Sheets-Sheet 1
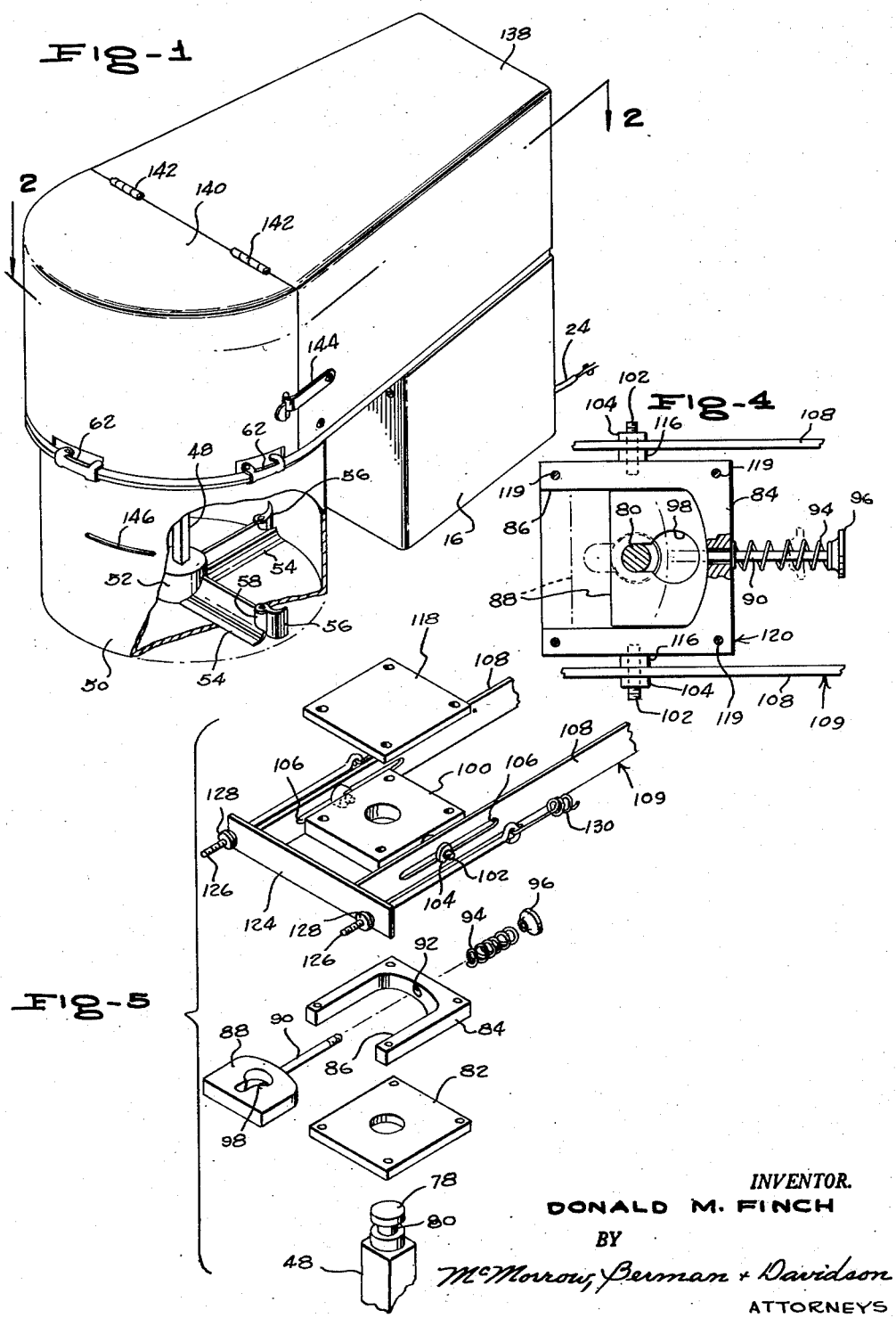
INVENTOR.
DONALD M. FINCH
BY
McMorrow, Berman + Davidson
ATTORNEYS

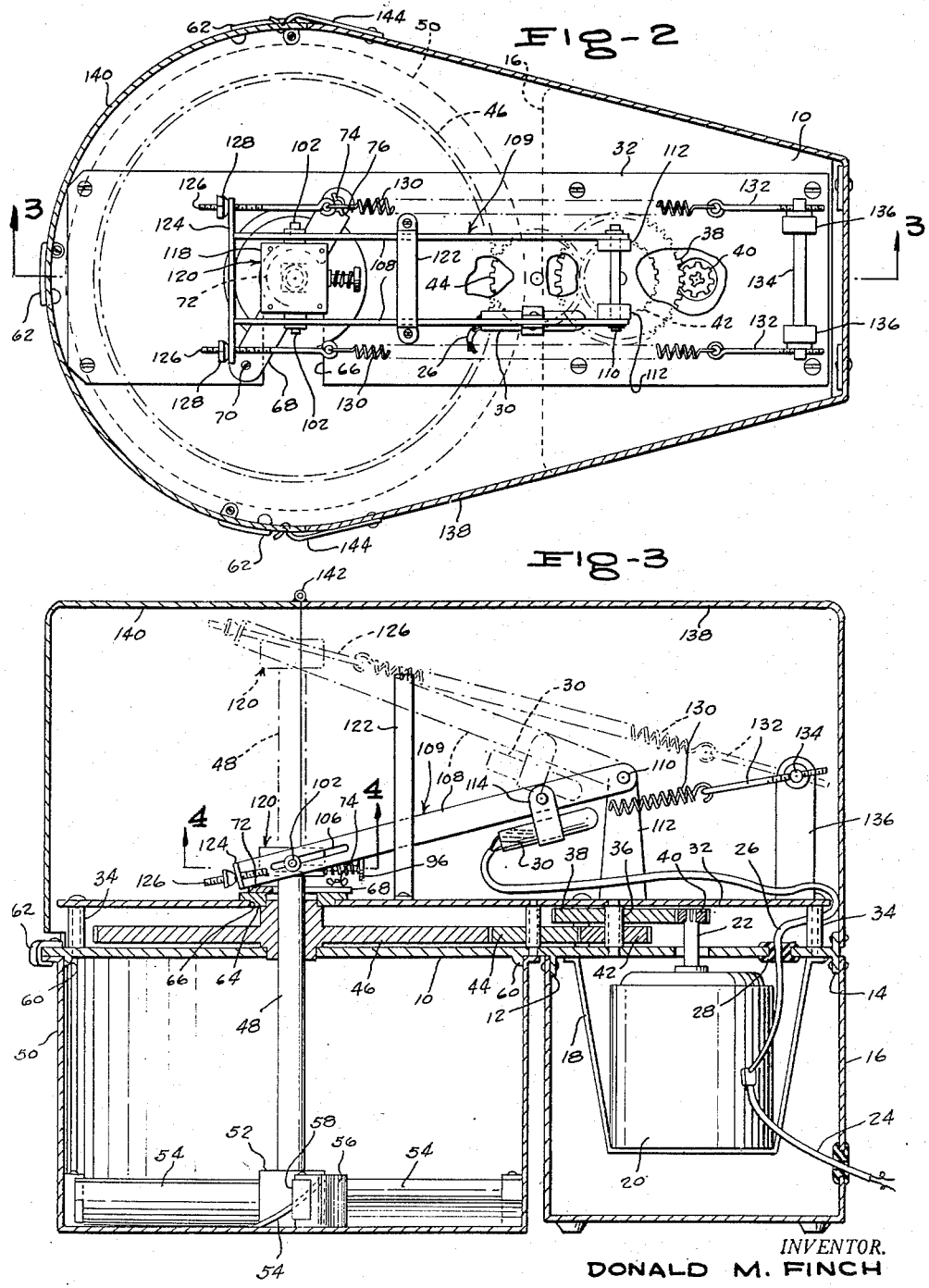

United States Patent Office 2,793,505
Patented May 28, 1957

2,793,505
PADDLE-OUT ICE CREAM FREEZER
Donald M. Finch, Hayden, Ariz.
Application September 23, 1955, Serial No. 536,211
3 Claims. (Cl. 62—114)

This invention relates to an improved ice cream freezer for use in a refrigerator.

The primary object of the invention is to provide a more practical and efficient ice cream freezer of the character indicated which has a paddle rotor which is arranged to rise to progressively higher levels within the ice cream mix during the freezing of the mix, responsive to the progressive solidifying of the mix from the bottom to the top thereof.

Another object of the invention is to provide a freezer as described wherein the paddle rotor is entirely withdrawn above the top of the mix and the container for the ice cream mix, when the ice cream is frozen, can be swiftly detached from the remainder of the freezer, the container then being free to serve as a receptacle in which the ice cream can be kept until it has been fully used.

A further object of the invention is to so form the paddle rotor as to facilitate its bodily removal from the freezer, for cleaning purposes.

Still another object is to provide an improved paddle rotor for agitating the ice cream mix, which provides more effective stirring of the ice cream mix, and has side scraper means which continually scrapes the mix from the sides of the container.

Another object is to provide a motor driven freezing device for ice cream which is highly compact so as to occupy a minimum amount of space when in use or when in storage, is adapted for manufacture at low cost, is fully automatic in operation and provides for shutting off of its motor upon complete freezing of the mix, and is adapted to be turned on merely by depression of the paddle rotor and its associated paddle support means to their starting positions.

Other objects will appear from the following description, the claims appended thereto, and from the annexed drawings, in which like reference characters designate like parts throughout the several views and wherein:

Figure 1 is a perspective view, portions being broken away, of an ice cream freezer according to the present invention;

Figure 2 is an enlarged horizontal sectional view on line 2—2 of Figure 1;

Figure 3 is a vertical longitudinal sectional view on line 3—3 of Figure 2;

Figure 4 is an enlarged, detail horizontal sectional view taken on line 4—4 of Figure 3; and Figure 5 is a fragmentary, exploded perspective view showing the means for connecting the paddle rotor shaft to the vertically swingable rotor support assembly.

Referring in detail to the drawing, the illustrated freezer comprises a flat horizontally disposed main partition or base plate 10, having a curved front end edge 11, is reduced progressively in width toward its rear end 13. Integrally formed on the underside of the plate 10, at the rear end portion thereof, are longitudinally spaced flanges 12, 14, extending the full width of the main plate and connected to the upper ends of the front and rear walls of a rectangular motor housing 16 depending from the main plate. Secured to the underside of the main plate within the housing 16 is a depending, approximately U-shaped motor support bracket 18, when bight portion is mounted a vertical electric motor 20 having a short, upwardly projecting shaft 22 extending through an opening 23 formed in the main plate. The motor is supplied with electricity through a cord 24 extending through an opening in the side wall of housing 16 and provided, exteriorly of the housing, with a connector plug, not shown, adapted to be engaged in a current outlet, also not shown. A mercury switch 30 is connected by a cord 26 to the cord 24.

An elongated horizontal rectangular plate 32 extends longitudinally and centrally of the main plate 10 and is spaced closely thereabove, and is secured in position by upstanding sleeved legs 30 rising from the main plate 10.

A shaft 36 is vertically journaled in and extends between the plate 10 and plate 32, forwardly of the motor shaft 22, and connected to the shaft 36 for rotation therewith is a gear wheel 38 meshing with a pinion 40 secured to the motor shaft 22. A gear wheel 42 smaller than the gear wheel 38 is also secured to the shaft 36 below the gear wheel 38, and is in mesh with a gear wheel 44 mounted on a shaft 45 secured between the plates 10 and 32. The gear wheel 44 is in mesh with a large paddle rotor drive gear wheel 46 disposed in the space between the main plate 10 and the upper plate 32.

The gear wheel 46 has a hub formed with a center opening 46' which is square or otherwise non-circular in cross section, and slidably engaged through the opening 46' is a vertically disposed rotor shaft 48 having the same cross section as the opening 46', thus connecting the shaft 48 to the gear wheel 46 for rotation therewith, while permitting free slidable movement of the shaft relative to the gear wheel 46 between elevated and depressed positions.

A cylindrical container 50 for ice cream mix to be frozen surrounds the shaft 48. Fixed on the lower end of the shaft 48 is a rotor 51 comprising a collar 52, in which collar are embedded or otherwise fixed the inner ends of radial, outwardly projecting paddles 54. The paddles in the illustrated example are angularly spaced about the shaft 48 ninety degrees apart, and are pitched at an angle to the shaft 48, to insure a proper stirring or agitation of the ice cream mix within the container 50. Scraper blades 56 of laterally curved formation as shown in Figure 1, are hingedly connected at 58 to the outer ends of the paddles 54, and are adapted to scrape frozen particles from the side wall 53 of the container 50 during the rotation of the paddle rotor. In this connection, the scrapers 56 are held in wiping contact with the side wall of the container by the pressure of the ice cream mix thereagainst during rotation of the rotor, so that the side wall 53, of the container is kept clear of frozen particles which might otherwise impede free rotation of the rotor.

The container 50 is detachably connected to the underside of the main plate 10, by latches 62 on the plate 10 engaged around and outwardly directed peripheral flange 59 on the upper end of the container. The container 50 is properly disposed in concentric relation to the shaft 48 by aligning lugs 60 depending from and preferably integrally formed upon the underside of plate 10. The latches are shown to particular advantage in Figures 1 and 2, and are pivotally mounted upon the upper surface of the plate 10, at locations spaced ninety degrees apart about the rounded front edge of the plate 10. The latches are formed at the free ends thereof with lateral extensions, adapted to engage one over the edge of plate 10 and the other against the underside of the peripheral flange 59 of container 50.

As shown in Figure 3, the hub of the gear wheel 46 has a reduced lower portion engaged on a bearing opening formed in the plate 10, and a reduced upper portion of the gear hub is journaled in a center opening provided in a removable bearing plate 64 supported upon the upper plate 32 and located at the inner end of a laterally opening slot 66 (see Figure 2) provided in the upper plate 32. Normally overlying the bearing plate 64 is a hold-down arm 68 (Figure 2) which is pivotally connected at one end, as indicated at 70 to the plate 32. The arm 68 is adapted to be secured in a position in which it extends diagonally across the bearing plate 64 through the provision of a stud 73 extending upwardly from the plate 32. A wing nut 74 is threadedly engaged with the stud and bears upon the free end of the hold-down arm 68. The hold-down arm has a laterally opening slot 75 at its free end which receives the stud 73.

Medially between its ends, the hold-down arm 68 has an arcuate portion 72, to provide clearance for the shaft 48, which extends upwardly through the center opening of the bearing plate 64.

The purpose of this arrangement is to permit the gear wheel 46, and the associated rotor assembly, to be removed bodily from the remaining portion of the device, by being shifted laterally out of the slot 66. Under these circumstances, the hold-down arm would first be swung to the left in Figure 2 out of engagement with the plate 64, permitting removal of plate 64, which permits the gear wheel 46 to be lifted upwardly slightly out of engagement with the plate 10, and permits the gear wheel and the rotor assembly to be removed.

At its upper end (see Figure 5) the rotor shaft 48 has a reduced, cylindrical, axial extension 78, and said extension 78 intermediate its ends has a circumferential groove defining a reduced part 80 on the extension.

The provision of the axial extension 78 on the shaft 48 defines a shoulder 79 at the upper end of the squared portion of the shaft. Seated upon said shoulder 79 is a rectangular plate 82 (Figure 5) having a center opening through which the extension 78 extends. Resting upon the upper side of the plate 82 is a slide support plate 84, having a wide, forwardly opening slot 86, in which is slidably engaged a flat detent 88 formed with a rearwardly projecting stem 90 slidable in an opening 92 of the plate 84. The stem 90, as shown in Figure 4, has an expanding spring 94 coiled thereabout, the spring 94 being compressed between the adjacent end of plate 84 and a head or button 96 threaded upon the outer end of the stem.

The detent 88 is centrally formed with a keyhole slot 98, the smaller end of which is adapted to receive the reduced part 80 of extension 78 when the spring 94 is expanded and disposes the detent in its normal, locking position shown in full lines in Figure 4. At any time that the rotor assembly is to be removed, it is merely necessary that the button 96 be pushed against the resistance of the spring 94 to shift the detent to the dotted line position in Figure 4, wherein the shaft extension 80 is in the large end of the keyhole slot 98. Overlying the guide plate 84 is a rectangular plate 100 having a center opening receiving the upper end of axial extension 78, and plate 100 is formed at opposite side edges thereof with outwardly projecting trunnions or lugs 102, threaded at their outer ends to receive nuts 104. The trunnions extend through longitudinal closed slots 106 formed in the free forward ends of a pair of laterally spaced, parallel arms 108 of a switch arm assembly 109.

At their rear ends, the arms 109 have openings that are horizontally pivoted at 110 to the upper ends of standards 112 projecting upwardly from the upper plate 32. Arms 108 are thus mounted upon the plate 32 for upward and downward swinging movement between the full and dotted line positions shown in Figure 3.

Secured along and beneath one of the arms 108 by a bracket 114 is a mercury switch 115.

To space the arms 108 from the side edges of the plate 100 spacer washers 116 are circumposed on the trunnions 102 between the arms and the plate 100, as shown in Figure 4.

A cover plate 118 overlies the plate 100 and has corner openings registering with corner openings in the plates 100 and 84, which receive assembling pins 119.

Guiding the arms 108 in their up-and-down swinging movement, and limiting the movement of the arms beyond an extreme elevated position thereof, shown in dotted lines in Figure 3, is a guide 122 of inverted U-shape straddling intermediate portions of the arms and bolted at its lower end to the upper plate 32.

Fixed to and extending laterally outwardly beyond the free ends of the arms 108 is a cross bar whose outer ends are formed with openings receiving connecting rods 126 positioned along the laterally outward sides of the arms. The rods 126 are threaded to receive adjusting nuts 128. The adjusting nuts bear against the forward side of the cross bar and are adapted to be turned to move the rods 126 to the left in Figure 2.

Contractile springs 130 are stretched between the forward rods 126 and rear connecting rods 132. The rear ends 132 are threaded through openings provided in the opposite ends of a pin 134 supported in and extending between posts 136 mounted in upstanding positions upon the upper plate 32 behind the standards 112.

A housing 138 encloses the mechanism above the upper plate 32 and is secured at its lower edge to the main plate 10. The housing 138 is closed at its rear end, top, and sides, but is formed open at its front end. A lid or cover 140, providing access to the interior of the housing 138, is hingedly connected to the forward end of the housing 138 as at 142, and normally closes the forward end of the housing, the cover 140 is adapted to be latched in its normally closed position, by spring latches 144 mounted upon the sides of housing 138 and engaging at their free ends in side openings provided on the cover (see Figures 1 and 2).

To provide the user with a guide as to the level to which the container 50 should be filled, there is provided a horizontal marking 146 on the side wall 53 of the container.

As shown in Figure 3, the pivot axis 110, about which the arms 108 swing, lies in the same horizontal plane as the pin 134 to which the rear ends of springs 130 are connected through the medium of the rods 132. The pivot 110, further, is disposed intermediate opposite ends of the spring, and accordingly, whenever the arms 108 travel past a horizontal position, the springs contract and snap the arms 108 either to their extreme elevated or extreme depressed position.

When the device is not in use, the arms 108 are disposed in their extreme elevated position shown in dotted lines in Figure 3.

To use the device, the container 50 is removed and is filled to a proper level indicated by the mark 146 with unfrozen ice cream mix. The container 50 is then connected by the latches 62 to the underside of the plate 10. The cover 140 is then opened to provide access to the switch arm assembly 109. Using the cross bar 124 is a handle, the switch arm assembly is pressed downwardly until the arms swing past dead center, whereupon the springs 130 contract and depress the arms 108 to their depressed position. This disposes the rotor paddles 54 at the bottom 50' of the container 50, as shown in Figure 3. As the arms are depressed as described, the switch 30 closes the circuit to the motor 20 and rotation of the paddle rotor starts.

The device is then placed upon the freezing coils of a conventional home freezer, or of the freezing compartment of a refrigerator so that the ice cream mix will freeze upwardly from the bottom of the container 50.

As the mix begins to solidify at the bottom of the container 50, the more solid part of the mix at the bottom of the container pushes the rotor upwardly against the resistance of the springs 130 due to the climbing action of the paddles on the mix. In this way, the paddles are progressively moved to successively higher elevations within the container 50, being at all times disposed immediately above the already solidified part of the mix. The scrapers 56, meantime, keep the side wall 53 of the container 50 free of frozen cream, assuring free rotation of the paddle rotor 51 within the still liquid portion of the mix.

When the mix becomes completely frozen and the paddle rotor moves above the mark 146 and rises out of the mix, the arms 108 will have reached above their dead center position, so that the springs 130 are freed to contract and pull the arms 108 to their extreme elevated position, shown in dotted lines in Figure 3, wherein the mercury switch 30 is tilted to position in which the switch opens the motor circuit and stops the motor 20. Automatic stopping of the ice cream freezer operation thus results, and it is now necessary only to remove the container 50.

When the container 50 is removed, it constitutes a bowl-like receptacle for the ice cream, in which receptacle the ice cream can be kept until it has been completely used.

As will be noted, the construction is such as to assure that the paddles are not embedded within the frozen product at the completion of the freezing operation, as distinguished from devices known in the art, in which the stirring means remains so embedded.

It is believed apparent that the invention is not necessarily confined to the specific use or uses thereof described above since it may be utilized for any purpose to which it may be suited. Nor is the invention to be necessarily limited to the specific construction illustrated and described, since such construction is only intended to be illustrative of the principles, it being considered that the invention comprehends any minor change in construction that may be permitted within the scope of the appended claims.

What is claimed is:

1. In an ice cream freezer, a support, an ice cream mix container having an open top, a side wall, and a bottom wall, said container being removably secured to the underside of the support, a vertical rotor shaft slidably and rotatably mounted on said support, said rotor shaft having an upper portion located above the support and a lower portion located below the support and in said container, a paddle rotor fixed on said lower portion of the rotor shaft, said rotor shaft being vertically movable from a depressed position on which said rotor is at the bottom of the container to an elevated position on which the paddle rotor is at the upper end of the container, the bottom of the container being arranged to have freezing means applied thereto to freeze the mix in the container upwardly in the container, said paddle rotor having paddles tilted to ride upwardly upon frozen mix into unfrozen mix in the container and produce upward movement of the rotor shaft away from its depressed position, an electric motor on said support and operatively connected to the rotor shaft for rotating the rotor shaft in a direction in which the paddles ride upwardly upon frozen mix in the container, and a switch assembly mounted on said support, including a switch in circuit with said motor, said switch assembly comprising arm means operatively connected to the said upper portion of the rotor shaft.

2. In an ice cream freezer, a support, an ice cream mix container having an open top, a side wall, and a bottom wall, said container being removably secured to the underside of the support, a vertical rotor shaft slidably and rotatably mounted on said support, said rotor shaft having an upper portion located above the support and a lower portion located below the support and in said container, a paddle rotor fixed on said lower portion of the rotor shaft, said rotor shaft being vertically movable from a depressed position on which said rotor is at the bottom of the container to an elevated position on which the paddle rotor is at the upper end of the container, the bottom of the container being arranged to have freezing means applied thereto to freeze the mix in the container upwardly in the container, said paddle rotor having paddles tilted to ride upwardly upon frozen mix into unfrozen mix in the container and produce upward movement of the rotor shaft away from its depressed position, an electric motor on said support and operatively connected to the rotor shaft for rotating the rotor shaft in a direction in which the paddles ride upwardly upon frozen mix in the container, and a switch assembly mounted on said support, including a switch in circuit with said motor, said switch assembly comprising arm means operatively connected to the said upper portion of the rotor shaft, arm means having a forward end connected to the upper portion of the rotor shaft and a rear end pivoted to the support and being arranged to occupy a dead center position, and spring means acting between said arm means and a portion on said support for moving and holding said arm means in a depressed position below the dead center position on an elevated position above the dead center position.

3. An ice cream freezer according to claim 2 wherein said switch assembly further comprises a mercury tilt switch secured to said arm means and arranged to be in open position in the dead center position and in the elevated position of said arm means and to be in closed position in the depressed position of said arm means corresponding to the depressed position of the rotor shaft.

References Cited in the file of this patent

UNITED STATES PATENTS

| 1,766,172 | Hiles | June 24, 1930 |
| 1,868,882 | Campbell | July 26, 1932 |
| 1,885,139 | Porter | Nov. 1, 1932 |
| 2,317,624 | Lindsey | Apr. 27, 1943 |
| 2,719,031 | Morgan | Sept. 27, 1955 |

FOREIGN PATENTS

| 668,330 | Germany | Dec. 1, 1938 |